US012263449B2

(12) United States Patent
Connors, Jr.

(10) Patent No.: US 12,263,449 B2
(45) Date of Patent: Apr. 1, 2025

(54) TANGENTIAL FLOW FILTRATION MANIFOLD (71) Applicant: John F. Connors, Jr., Shrewsbury, MA (US)

(72) Inventor: John F. Connors, Jr., Shrewsbury, MA (US)

(*) Notice: Subject to any disclaimer, the term of this patent is extended or adjusted under 35 U.S.C. 154(b) by 0 days.

(21) Appl. No.: 17/839,532

(22) Filed: Jun. 14, 2022

(65) Prior Publication Data
US 2022/0395782 A1  Dec. 15, 2022

Related U.S. Application Data

(60) Provisional application No. 63/210,234, filed on Jun. 14, 2021.

(51) Int. Cl.
*B01D 63/08* (2006.01)

(52) U.S. Cl.
CPC ....... *B01D 63/0822* (2022.08); *B01D 63/081* (2013.01); *B01D 2221/10* (2013.01); *B01D 2313/105* (2013.01); *B01D 2313/125* (2013.01); *B01D 2313/2031* (2022.08); *B01D 2313/54* (2013.01); *B01D 2315/10* (2013.01); *B01D 2319/04* (2013.01)

(58) Field of Classification Search
CPC .............. B01D 63/0822; B01D 63/081; B01D 2221/10; B01D 2313/105; B01D 2313/125; B01D 2313/2031; B01D 2313/54; B01D 2315/10; B01D 2319/04; B01D 63/084; B01D 61/14; B01D 2313/10; B01D 2313/12
See application file for complete search history.

(56) References Cited

U.S. PATENT DOCUMENTS

| | | | | |
|---|---|---|---|---|
| 4,715,955 A * | 12/1987 | Friedman | ............ | B01D 63/084 210/321.72 |
| 5,147,542 A * | 9/1992 | Proulx | ................ | B01D 63/084 210/321.75 |
| 2002/0170854 A1* | 11/2002 | Kuss | .................. | B01D 63/0822 210/232 |
| 2012/0174996 A1* | 7/2012 | Cirou | .................... | B01D 61/20 137/544 |
| 2013/0037486 A1* | 2/2013 | Sayer | .................... | B01D 61/00 210/321.72 |
| 2014/0305860 A1* | 10/2014 | Ekstrom | ................ | B01D 63/08 408/1 R |
| 2022/0347630 A1* | 11/2022 | Stobbe | .................. | B01D 61/20 |

* cited by examiner

*Primary Examiner* — Pranav N Patel
(74) *Attorney, Agent, or Firm* — Armis IP Law, LLC (57) ABSTRACT

A tangential flow filtration manifold takes a modular form for interconnection in a manifolded arrangement for aggregating a total filtration area of the aggregate filter (membrane) surface. A plurality of modular TFF cassette filters may be or stacked on the TFF manifold such that it allows the number of interconnected filters, as well as the membrane surface area within each cassette, to be readily reconfigured. A single output, or filtrate connection on the TFF manifold simplifies fluidic plumbing connections for directing and gathering the filtrate (permeate) produced as output.

12 Claims, 12 Drawing Sheets

TANGENTIAL FLOW FILTRATION MANIFOLD

RELATED APPLICATIONS

This patent application claims the benefit under 35 U.S.C. § 119(e) of U.S. Provisional Patent Application No. 63/210,234, filed Jun. 14, 2021, entitled "TANGENTIAL FLOW FILTRATION MANIFOLD," incorporated herein by reference in entirety.

BACKGROUND

Tangential Flow Filtration (TFF) filters are employed in pharmaceutical and biotechnology for membrane based filtering of various fluids, typically for condensing a fluid to a higher concentration and/or purity. Each TFF filter has a membrane area over which a fluid flows, and a filtrate results from the material that passes through the membrane. The membranes are selected for a variety of properties depending on the filtrate or permeate intended to pass. TFF filters direct fluid in a parallel direction across the filter membrane surface, typically in a recirculation loop, which is in contrast to direct flow filters which force fluid perpendicularly into the filter membrane surface.

SUMMARY

A tangential flow filtration manifold takes a modular form of a cassette for interconnection in a manifolded arrangement for aggregating a total filtration area of the aggregate filter (membrane) surface. A plurality of modular TFF cassette filters may be stacked on the TFF manifold such that it allows the number of interconnected filters, as well as the membrane surface area within each cassette, to be readily reconfigured. A single output, or filtrate connection on the TFF manifold simplifies fluidic plumbing connections for directing and gathering the filtrate (permeate) produced as output. Combined with easily formed, single-use plastic construction, the TFF manifold arrangement is fabricated with fewer connections at a lower cost than conventional stainless steel manifolds.

Tangential Flow Filtration (TFF) manifolds are used to direct fluid into and out of a TFF filter, also known as a "TFF cassette" or "cassette." Currently, commercially available manifolds are made primarily from stainless steel, machined plastic, or molded plastic. Stainless steel manifolds are high-cost capital items that are cleaned and reused multiple times and therefore not disposable. On the other hand, plastic manifolds come at a much lower cost and are typically used once and discarded—making them suitable for single-use and disposable applications. Although configurations could apply to reusable stainless steel manifolds, it focuses on improving the usability of the plastic disposable manifold by simplifying the number of external connections required to operate it. Fewer external connections implies fewer parts to assemble and less time needed to do so. Specifically, fewer permeate (also known as "filtrate") connections are needed, meaning related flanges, clamps, and tubing are also eliminated. Due to an arrangement of permeate flow channels, the reduction of external permeate connections from two to one avoids any adverse impact on filtration performance.

TFF filters are therefore formed as modular elements that allow scaling of flow volume and filter area. The filter cassettes typically take one of two forms—a lab form factor and a larger production form factor. In each cassette, a layered arrangement of filter membranes channels the flow from the feed to the retentate across the planar membrane surface of each of the parallel layers. Filtrate, or more specifically permeate, that passes the filter membrane flows to the permeate outlet, which is the focus of configurations herein.

By way of background, the lab cassettes generally have an aggregate area of 0.1 $M^2$, while the production cassettes each provide 2.5 $M^2$ of filter membrane area. Due to the modular construction, a plurality of cassettes may be stacked to aggregate the filter area, and each has inlets and outlets defined as flush orifices on a generally flat surface that align with an adjacent cassette to form a fluidically sealed system. A clamped arrangement flanks the cassette stack, and includes a manifold at one end with a solid backing plate at the opposed end that seals the system. The manifold provides the fluidic ports for connection to lab apparatus for providing the feed and retentate, and for collecting the permeate. Any suitable number of cassettes may be stacked for communication with the manifold; the approach is suitable for any scale of filter area, and any fluidic source/collection may be attached to the fluidic ports, typically by an often complex arrangement of tubing and fittings. The claimed manifold simplifies the tubing arrangement by providing a single permeate port from which the permeate may be collected. Multiple manifolds may also be included in the filter stack in certain arrangements.

Configurations herein are based, in part, on the observation that conventional membrane filtration techniques rely on specialized fabricated TFF manifolds formed from stainless steel or other durable, easily sterilizable material. Unfortunately, conventional approaches to TFF arrangements suffer from the shortcoming that multiple (typically 2) output ports or apertures deliver the resultant filtrate from a conventional cassette. External fluidic connections, such as additional tubing, tees and associated plumbing are needed to gather and utilize the filtrate. Accordingly, configurations herein substantially overcome the cost and complexity of conventional TFF manifold arrangements by providing a modular manifold having a unitary filtrate output for receiving all fluid passed by the filter membrane surface. External merging and connections of multiple tubing lines are avoided, and the single use manifold is easily formed by 3-dimensional printing or similar fabrication techniques.

In an example configuration, a tangential flow condensing filter manifold includes at least one input for receiving fluid for filtration, and a single outlet for delivering filtrate. A filter membrane inside a cassette is in fluidic communication with each of the inputs, and a plurality of output vessels on an opposed side of the filter membrane gathers filtrate passed through the filter membrane. The output vessels join in a fluidic interconnection connected from each of the plurality of output vessels for aggregating the gathered filtrate, such that the fluidic interconnection combines into the single outlet for directing the gathered filtrate from each of the plurality of inlets. In contrast to conventional approaches, which require separate plumbing at each outlet, only a single filtrate connection is employed. The interconnection is such that a flow resistance to the filter membrane is substantially equal at each of the plurality of output vessels for balancing a flow across the filter membrane. In other words, the internal resistance and/or flow rate across the filter membrane does not favor certain portions or output vessels inside the cassette, therefore filter performance and throughput is not degraded in comparison to approaches with multiple filtrate outlets. Therefore, the fluidic interconnection does not affect a path of least resistance through the filter membrane.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Tangential Flow Filtration (TFF) is a type of filtration where the feed stream passes parallel to the membrane face as one portion of the flow passes through the membrane (permeate). Simultaneously, the remainder of the flow (retentate) recirculates back to the feed reservoir. The benefit of TFF versus normal flow filtration, e.g., a typical house water filter, is that the parallel flow across the membrane surface promotes cleaning by way of a sweeping actoon at the membrane's surface, which allows for higher volumetric throughput. Furthermore, the claimed manifold provides particular benefits specific to TFF "flat sheet" membrane that is laid flat and stacked in alternating layers.

These layers are then bound into a discrete unit using an adhesive to form the "cassette" device or filter. Next, to use the filter, one must have fluid a manifold to direct fluids into and out of the filter. The manifold will be lodged with the filter inside a clamping device designed to seal and compress the cassettes. Configurations herein illustrate improvements in the manifold. As the industry has generally migrated to plastics and single-use technologies, the prior art manifolds are no exception. Currently, plastic or single-use manifolds require four external connections, one inlet, and three outlets, two of which direct fluids from the permeate layers. The disclosed approach improves usability by reducing the number of permeate outlets without impacting filtration performance.

A conventional TFF manifold, therefore, employs at least two external connections. Configurations herein reduced this to a single permeate port without compromising effectiveness in the preferred embodiment. Since the TFF manifold has two internal permeate fluid passages, each connected separately to one of the two external permeate connections, the preferred embodiment connects fluid paths defined by channels within the manifold to exit through the single connection described above. Conversely, conventional approaches require the combination of the two permeate fluid streams outside of the TFF manifold using peripheral tubing and fittings. Indeed, one could choose to use only one external permeate connection of the prior art approach while leaving the other closed, but doing so affects filtration performance. Instead of having two exit points for permeate flow, one at each cassette end, there would be only one. By blocking one permeate connection on a prior art manifold, permeate fluid from the blocked end is forced to travel further across the membrane and through the cassette to exit. Since the cassette layers are tightly packed, this presents additional flow resistance.

Figure 1:
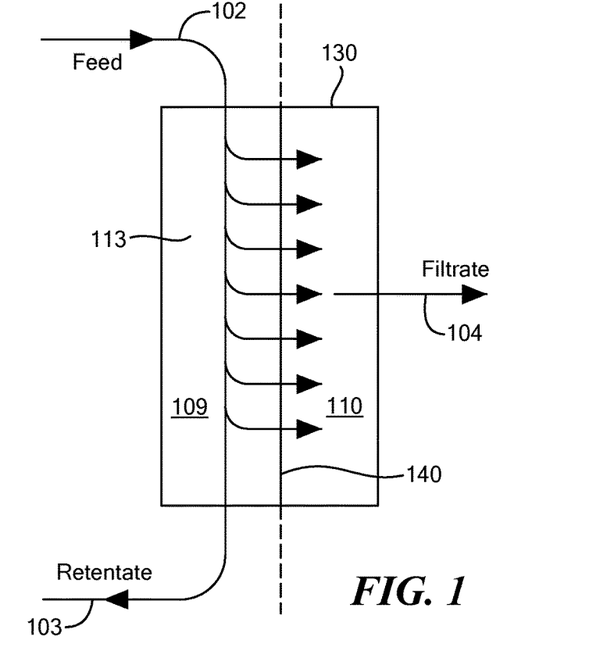
FIG. 1 is a context view of a tangential flow filtration (TFF) manifold assembly suitable for use in configurations herein.

FIG. 1 is a context view of a tangential flow filtration (TFF) manifold assembly 130 suitable for use in configurations herein. In a TFF manifold assembly, a feed flow 102 delivers a feed fluid 113 into a manifold assembly 130. The manifold assembly 130 includes a manifold and one or more filter cassettes, discussed further below. The manifold assembly directs the feed flow across a retentate side 109 of a filter surface 140. A permeate side 110 of the filter surface 140 receives substances that pass through the filter surface as the feed fluid 113 passes across the filter surface, while unfiltered material passes to the retentate flow 103. The filtrate on the permeate side 110 passes to the permeate flow 104. The manifold assembly determines the area of the filter surface and flow rate based on the delivery rate of the feed fluid 113 and the number and type of cassettes stacked to form the manifold assembly 130.

Figure 2:
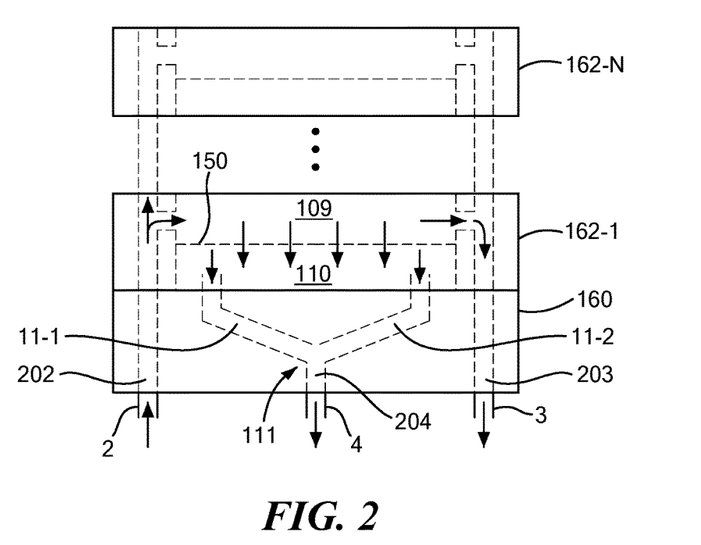
FIG. 2 is a schematic view of a TFF manifold assembly of FIG. 1.

FIG. 2 is a schematic view of a TFF manifold assembly of FIG. 1. Referring to FIG. 2, the full manifold assembly 130 is defined by a manifold 160 and one or more cassettes 162-1 . . . 162-N (162 generally) in a fluidically coupled arrangement to define the feed 102, retentate 103, and filtrate 104 flows. In the example configurations herein, the tangential flow filtration process includes a membrane filter 150, from which substances in the feed fluid 113 permeate thought the membrane filter 150 for gathering permeate on the permeate side 110; different filter and/or membrane types may result in a different filtrate composition on the permeate side 110.

The manifold includes a feed port 2, retentate port 3, and permeate port 4, for the respective flows. Each of the ports is adapted for connection to fluidic vessels for performing the desired filtration process. A typical arrangement is a tri-clamp flange for attachment to established laboratory and/or production fluid vessels, typically a tubing setup. In the tri-clamp setup, each of the feed port, retentate port and permeate port have a port diameter and terminus define by a flange having a flange diameter greater than the port diameter and adapted for engagement by the tri-clamp. A barbed attachment may also be employed. The manifold includes a feed channel 202 for receiving the feed fluid 113 from the feed port 2, and a retentate channel 203 for delivering the retentate to the retentate port 3, typically for recirculation via the aforementioned tubing and/or other laboratory or process setup.

The permeate flows from the permeate side 110 to a plurality of permeate passages 11-1 . . . 11-2 (11 generally)

from the collective array of filter cassettes 162. In contrast to conventional approaches, the permeate passages 11 aggregate at a junction 111 to merge with a common outflow 204 leading to the permeate port 4. The plurality of permeate passages 11 may be formed, drilled or molded in the manifold 160, and emanate from various orifices on the filter cassettes so that fluid pressure and balance across the membrane filter 150 is not disturbed. In other words, the manifold 160 redirects and channels the permeate to the individual permeate port 4 without imposing any changes on the filter cassette design or flow orifices; the junction 111 and associated permeate passages are formed within the manifold 160.

Figure 3A:
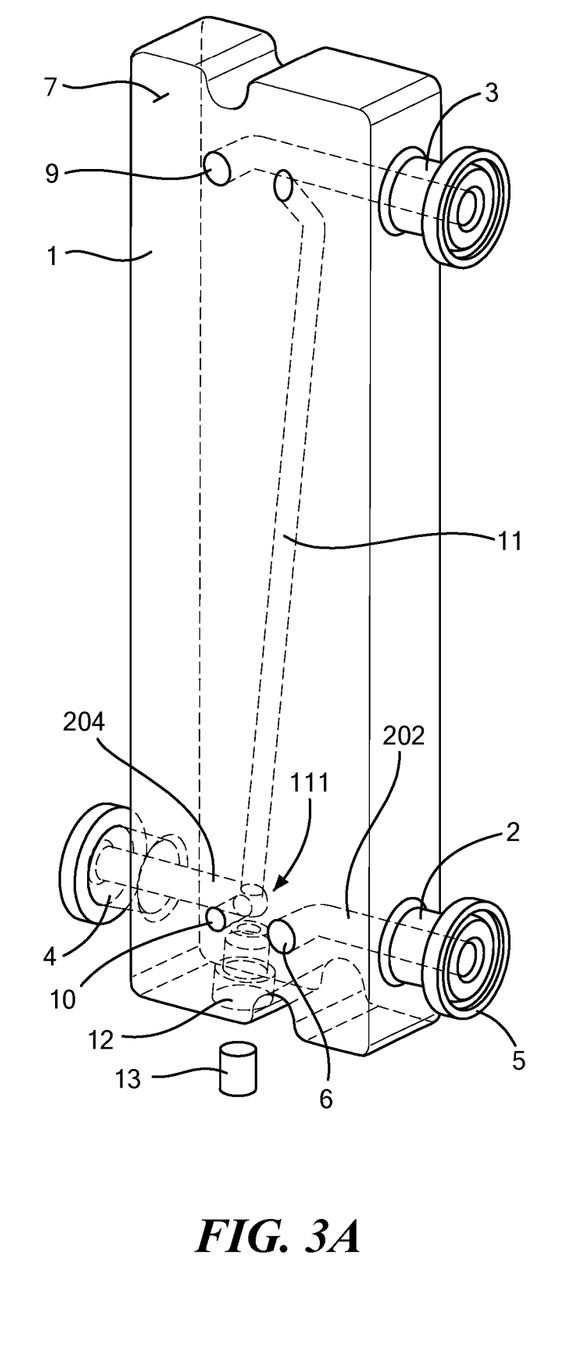
FIGS. 3A and 3B show an example configuration of a lab scale filter cassette based on the approach of FIGS. 1 and 2.
Figure 3B:
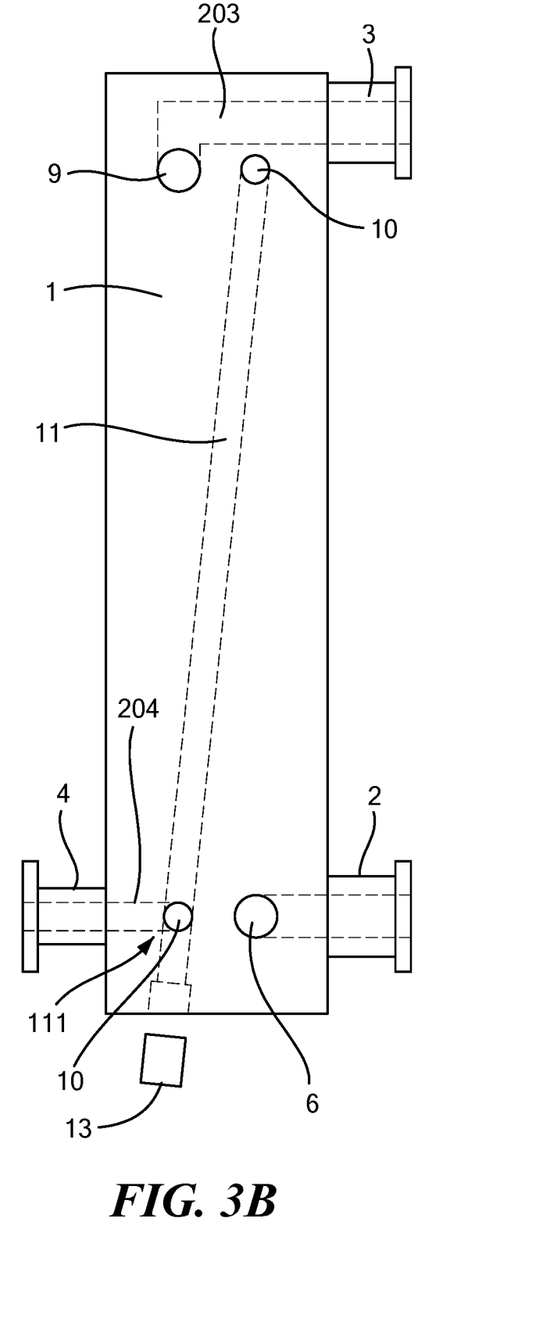

FIGS. 3A and 3B show an example configuration of a lab scale filter cassette based on the approach of FIGS. 1 and 2. Referring to FIGS. 1-3B, in a tangential flow filtration (TFF) apparatus for directing a feed across a filter membrane to a permeate passing through the filter and an unfiltered retentate, a manifold device for directing the feed, retentate and permeate includes a feed channel 202 fluidically coupling a feed port 2 to a feed outlet adapted to engage a filter assembly, and a retentate channel 203 fluidically coupling a retentate inlet to retentate port 3. The retentate inlet is adapted to receive retentate from the filter assembly through one or more retentate apertures 9. A plurality of permeate inlets align with permeate apertures 10 and are adapted to receive permeate from the filter assembly in a respective plurality of permeate channels 11, such that the permeate channels fluidically couple to the permeate port 4. The junction 111 defines a union fluidically coupling the plurality of permeate channels 11 for consolidating the flow into the individual permeate port 4.

A manifold 1 may be fabricated by a subtractive (machining) or additive manufacturing processes, preferably from polypropylene or like material that has been tested and approved for appropriate material handling. The manifold 1 dimensions will vary by size but range from 3¼ to 9¾ inch wide by 8½±1 inch long by ¾ to 3 inch thick. The manifold 1 will generally include fluid passageways defining the feed port 2 operable as the inlet for unfiltered material, retentate port 3 as the outlet for an unfiltered recirculation loop, and permeate port 4 providing the outlet for filtered material. A particular configuration uses a biopharmaceutical grade tri-clamp connection or an equally robust barbed connection to facilitate external links to the three fluid streams. FIGS. 3A and 3B show the tri-clamp type of connection flange 5.

Continuing to refer to FIGS. 1-3B, in operation the feed port connection 2 on the side of the manifold 1 is in fluid communication with at least one, and as many as twenty, feed apertures 6 on the manifold surface 7. The retentate port 3 on the side of the manifold is in fluid communication with at least one, and as many as twenty of the retentate apertures 9 on the manifold surface 7. Although not limited to the locations shown, a particular configuration positions the feed 2 and retentate 3 ports on the same side of the manifold for enhanced user accessibility.

Figure 4A:
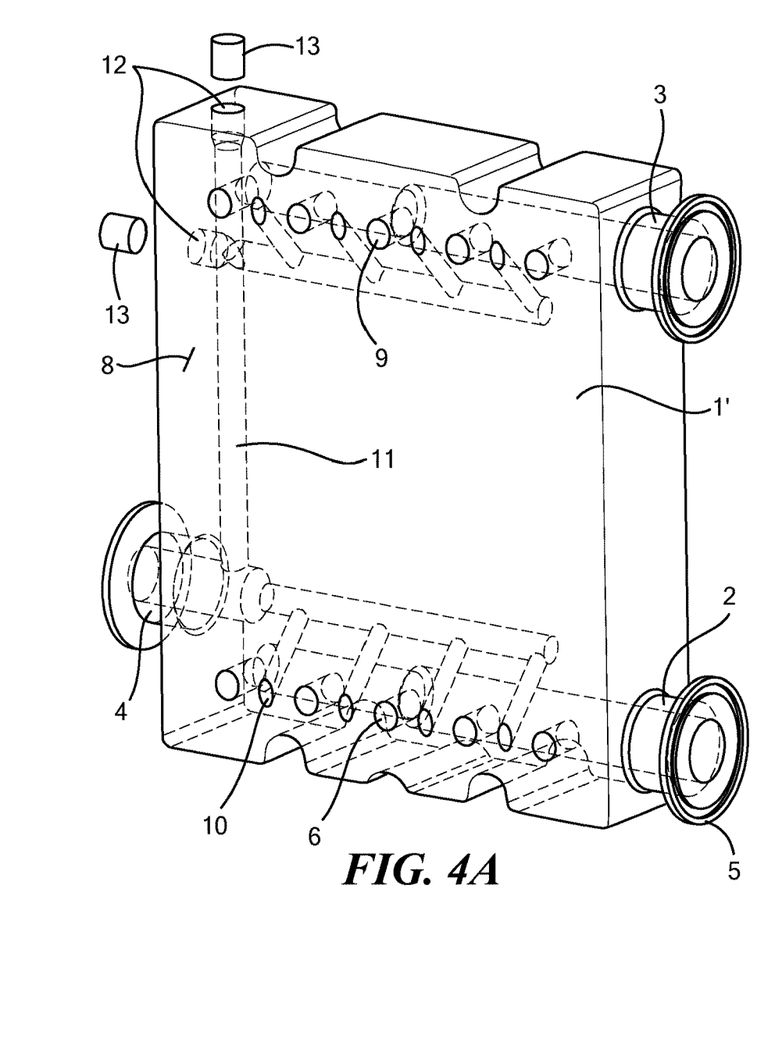
FIGS. 4A-4B show a process scale filter cassette and differences from the lab scale cassette.
Figure 4B:
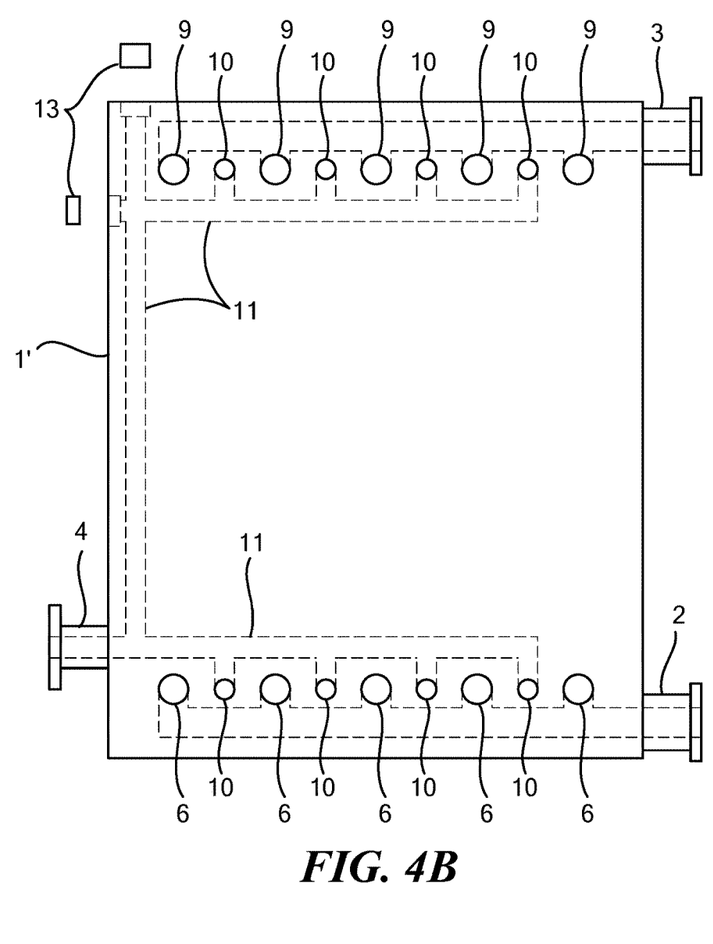

The permeate port 4 on the side of the manifold will be in fluid communication with at least two, and as many as thirty-two, permeate apertures 10 on the manifold surface(s) 7 and 8 (FIGS. 4A,4B). Furthermore, the permeate apertures corresponding to the feed and retentate ends of the manifold will be in fluid communication through tubular passages 11 within the manifold and collectively exit through the permeate port 4. Should the fabrication process be subtractive, i.e., machining, then the internal passageways connecting the permeates will require up to three external drill access ports 12, plus a corresponding sealing plug 13. The number of drill access ports 12 will depend on the location of the permeate port 4. Conversely, should the fabrication process be additive, i.e., 3D printed, external drill access ports may still be used but are not required. Sealing plugs 13, if needed, can be threaded inserts, bonded with adhesive, or welded in place using ultrasonics or similar techniques The manifold surface 7 has an array of orifices positioned for surface alignment and fluidic engagement with the filter cassette. The permeate inlets (apertures) 10 are positioned on the manifold 1 based on a correspondence to permeate orifices on the manifold filter assembly 130, and the union 111 couples the permeate channels 11 from each of the permeate inlets to the common outflow 204 fluidically coupled to the permeate port 4.

Due to the alignment of the feed 6, retentate 9 and permeate 10 orifices, a filter cassette stack of a suitable size may define the manifold filter assembly 130. The filter cassette stack includes one or more filter cassettes, each filter cassette having aligned feed, retentate, and permeate orifices adapted to form continuous feed, retentate and permeate paths through the filter cassette stack.

FIGS. 4A-4B show a process scale filter cassette and differences from the lab scale cassette. Process scale cassettes are intended for a production volume and also provide similar membrane filtration according to the concepts of FIGS. 1 and 2. A corresponding process scale manifold 1' may include a row of feed outlets, a row of retentate inlets and one or more rows of permeate inlets, such that the row of feed outlets, row of retentate inlets and the row of permeate inlets are defined by a predetermined position of orifices on the filter assembly 130 based on the cassette used. Process scale cassettes are larger and the surface 8 includes an array of feed 6, retentate 9 and permeate apertures 10 as described above. Both the lab and process manifolds arrange orifices to correspond to the respective feed, retentate and permeate flows.

Figure 5A:
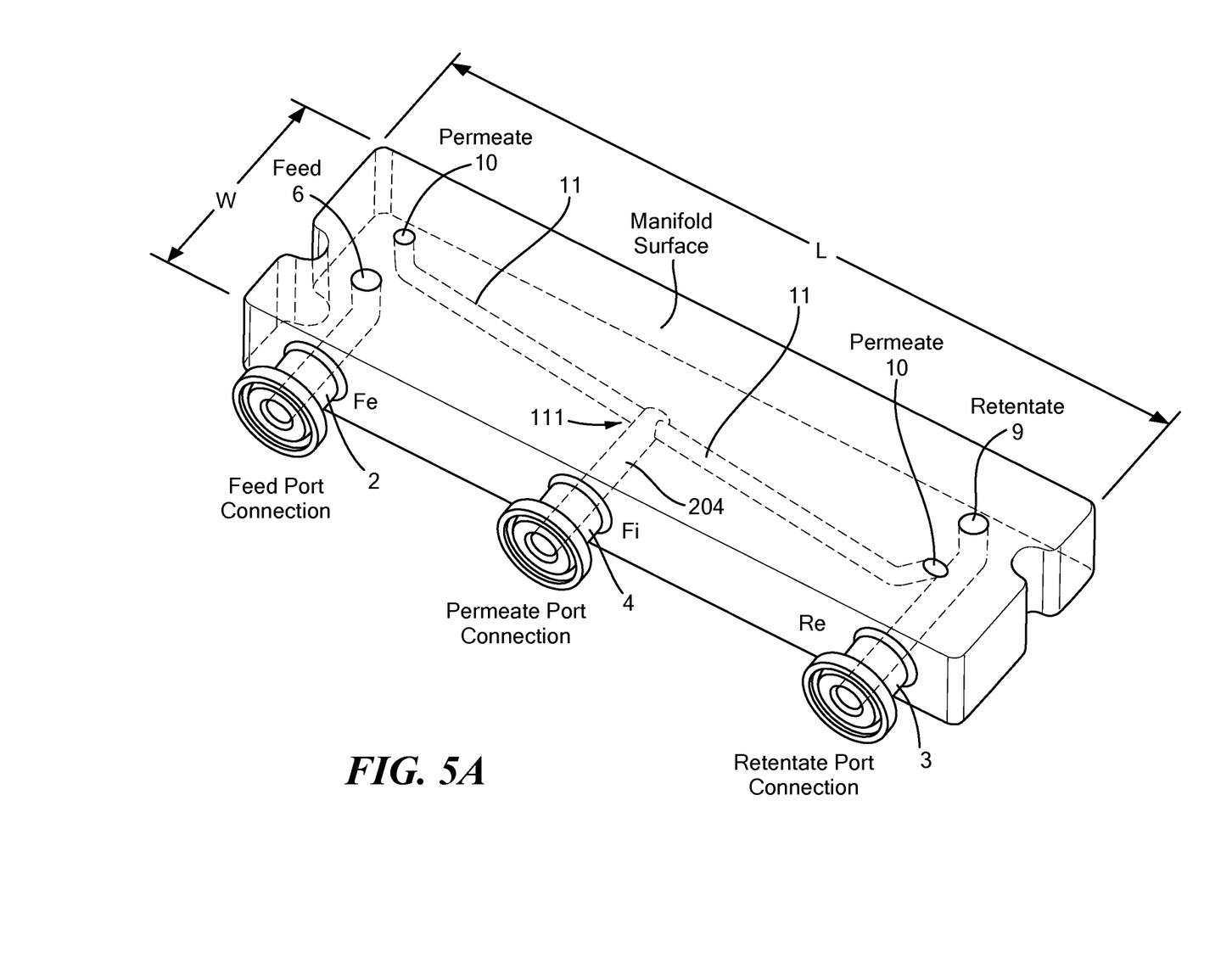
FIGS. 5A-5B show transparent and exploded views of a particular configuration of the lab filter cassette as in FIGS. 3A-3B.
Figure 5B:
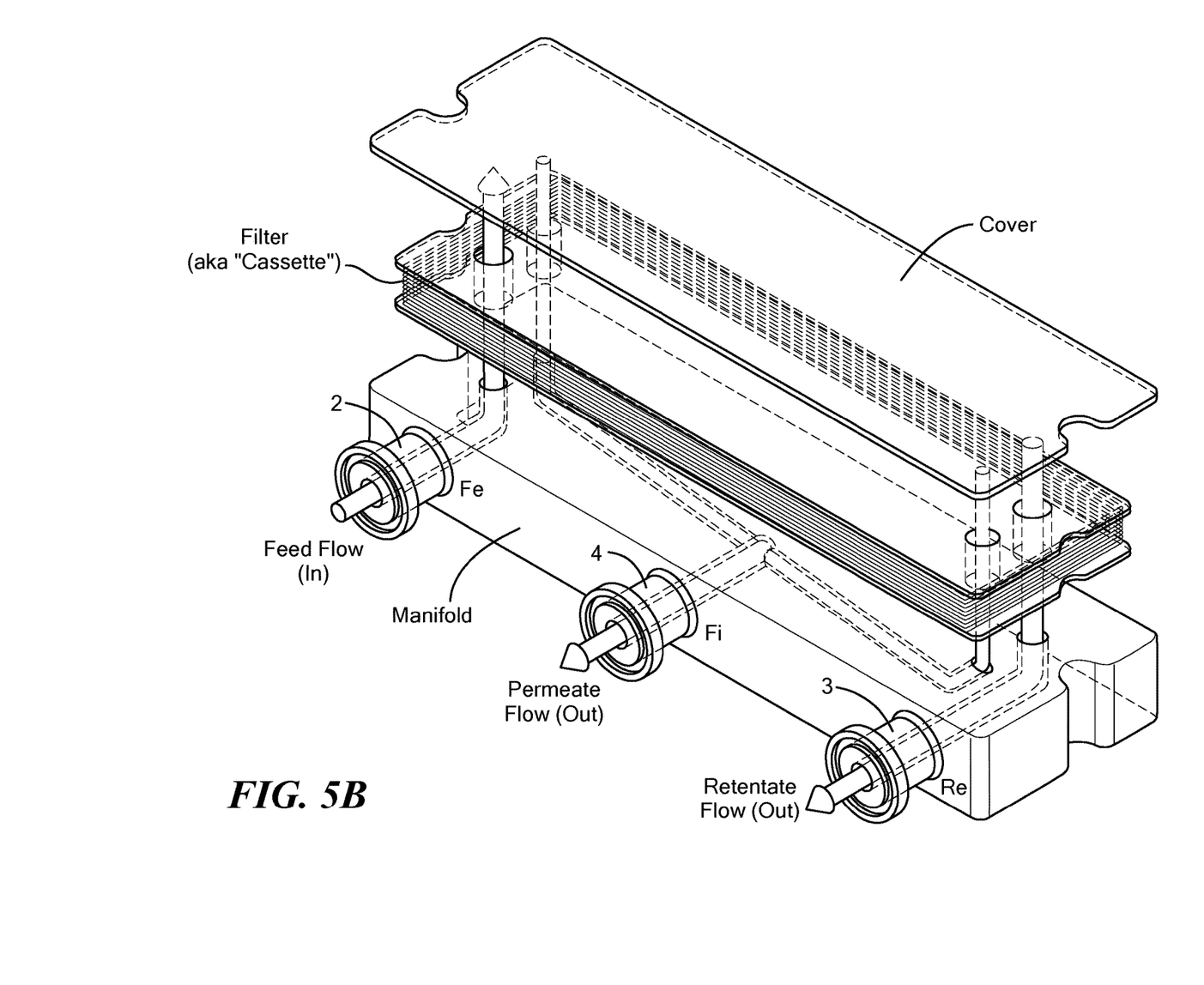

FIGS. 5A-5B show transparent and exploded views of a particular configuration of the lab filter cassette as in FIGS. 3A-3B. Referring to FIGS. 1-5B, in a particular arrangement, the ports include a feed 2 and a retentate 3, such that the feed and retentate are in fluidic communication on a particular (same) side of the manifold 1', further comprising the tangential flow path between the feed and retentate for forming a unidirectional fluid flow between the feed and retentate. This typically defines a recirculation loop, where the recirculation loop provides a fluidic connection for fluid exiting the retentate for directing the exiting fluid back to the feed. An iterative filtration cycle is established for achieving variable degrees of condensing the input via the filtrate. It is apparent that the union 111 couples each of a plurality of permeate channels 11 to a single, aggregate permeate port 4, such that each permeate channel receives the permeate from the filter assembly via a respective permeate flow 104.

In general, configurations herein depict that the union 111 is fluidically coupled to the permeate port 4 via a common outflow 204, and the permeate port is disposed at a predetermined position based on a position of the feed port and the retentate port, typically centered between on the same side or located on an opposed side. Other suitable configurations may fabricate the permeate port 4 and related channels 11 and union 111 at alternate locations.

In FIGS. 5A and 5B, the central flanked permeate port configuration of the lab-scale format of the manifold 1 is shown. One of the features of the disclosed approach is the internal routing of fluid from the two permeate orifices on the manifold surface to the single permeate outlet, or permeate port 4. It should also be understood that the feed orifice 6 and feed port 2 are in fluid communication, as are the retentate orifice 9 and retentate port 3. Thus, regardless of size, whether lab-scale or process-scale, these links between the external ports and manifold surface orifices are consistent.

In FIG. 5B, an exploded view of the filter and cover plate are shown for reference. This sketch further illustrates the lines of fluid flow through the manifold. As can be seen, the two separate permeate orifices at the surface of the manifold connect within the manifold and exit through a common outflow 204. The position of the permeate fitting connection, as shown, is believed to be the most versatile; however, one should note that fitting connections could be placed on either side of the manifold and off-center.

Figure 6:
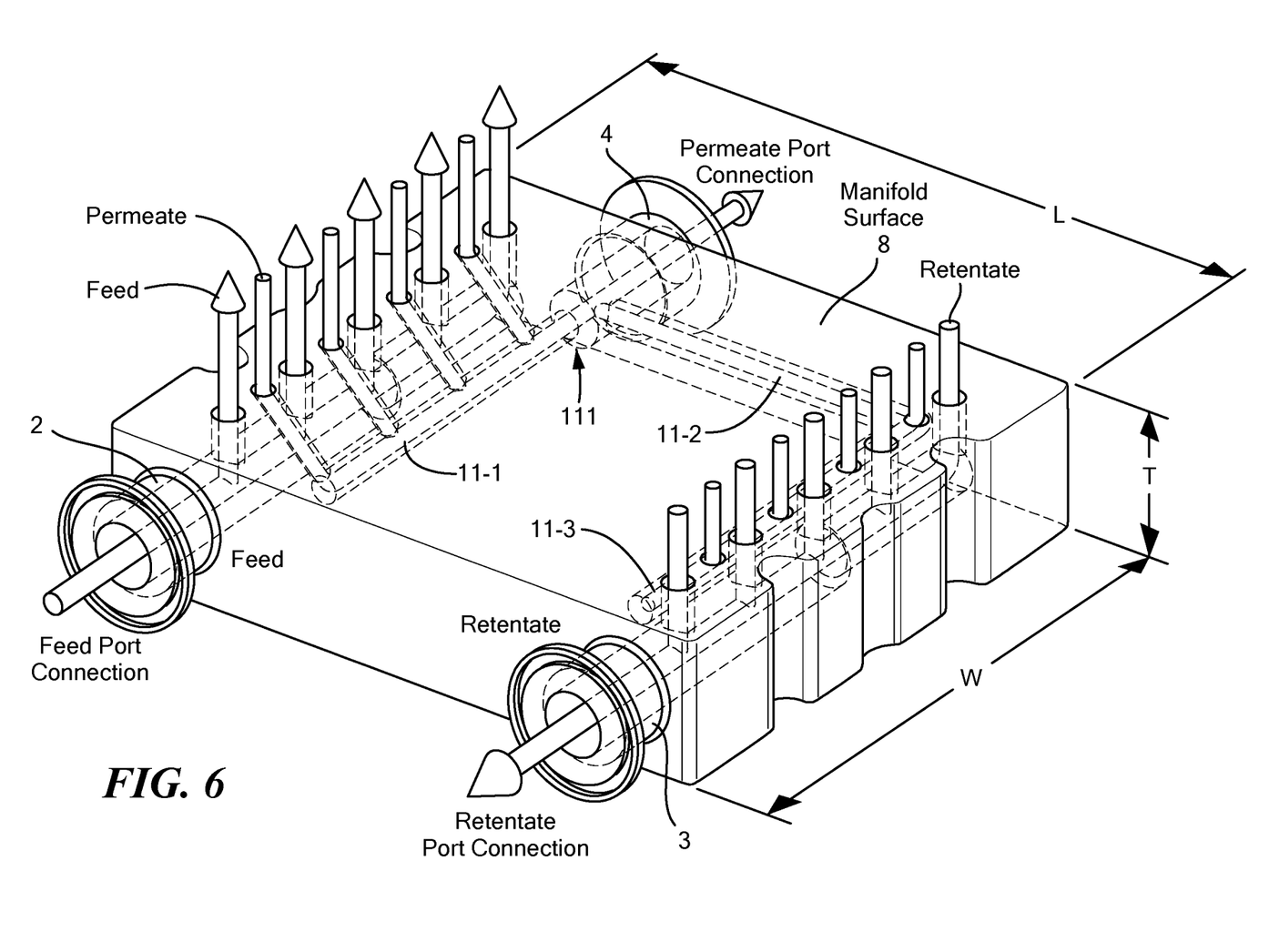
FIG. 6 shows a transparent view of a process filter cassette as in FIGS. 4A-4B.

FIG. 6 shows a transparent view of a process filter cassette as in FIGS. 4A-4B. Referring to FIGS. 4A-6, FIG. 6 illustrates aa process-scale format. In FIG. 6, the internal routing of fluid from the two permeate orifices and respective channels 11-1 . . . 11-2 leads from the manifold surface 8 to the single permeate port 4. As shown, this manifold receives cassettes only on one side; alternate configurations employ orifices and channels for engaging cassettes on both sides for enabling a larger number of cassettes in a "flow through" manifold assembly 130.

Figure 7:
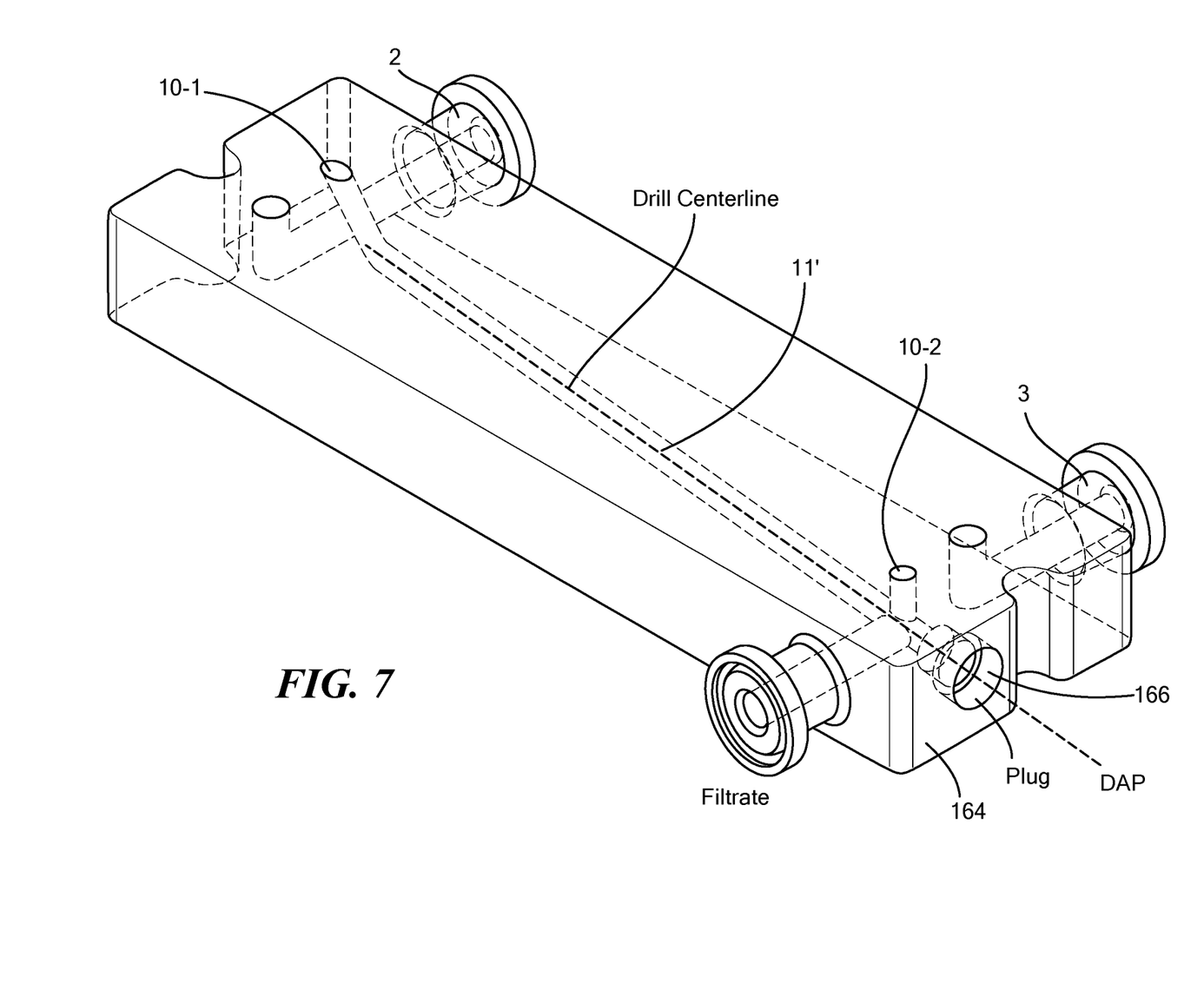
FIG. 7 shows a method of manufacturing the lab scale cassette of FIGS. 3A-3B.
Figure 8A:
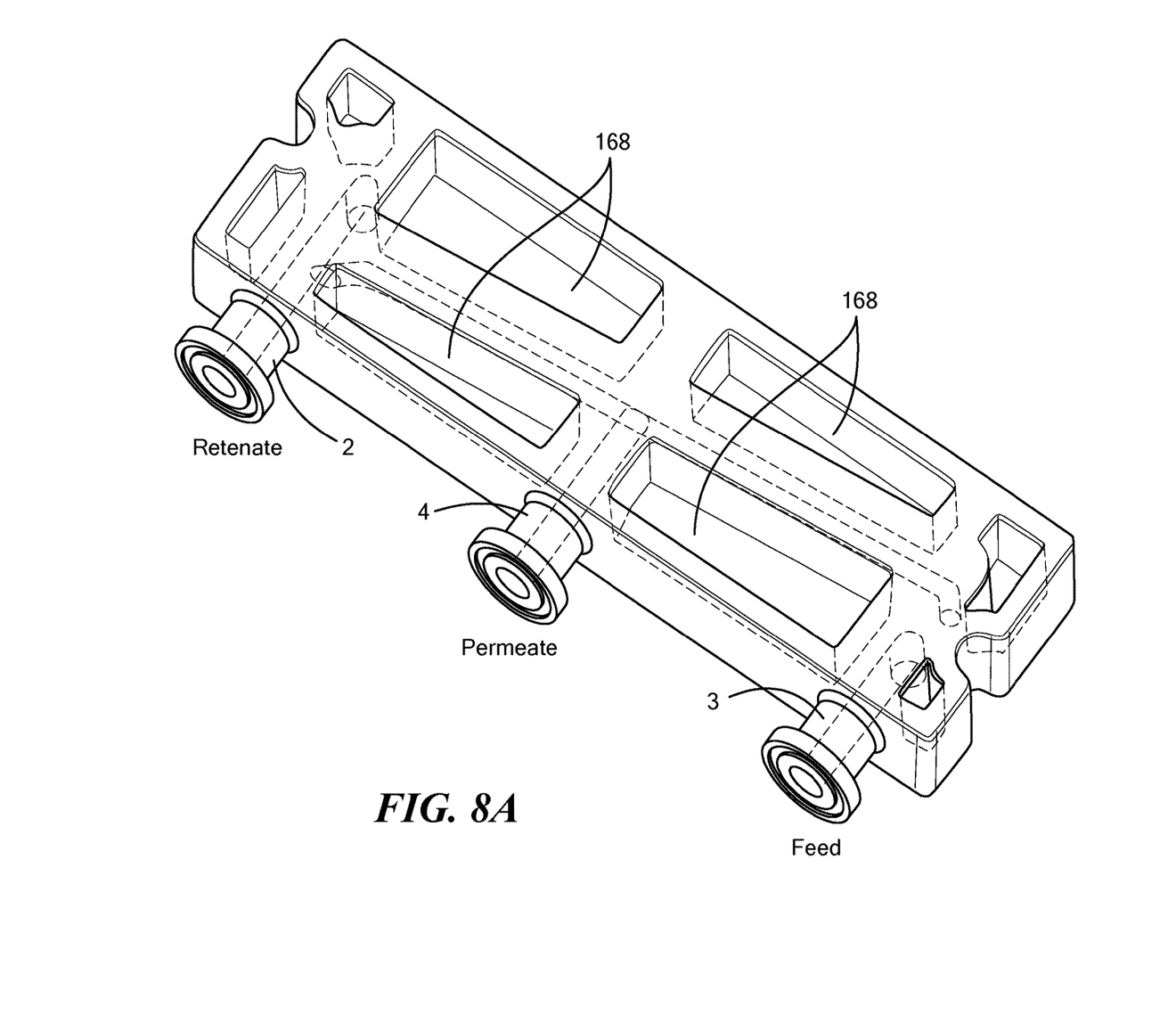
FIGS. 8A-8B show an alternative, additive manufacturing approach for the cassette of FIG. 7.
Figure 8B:
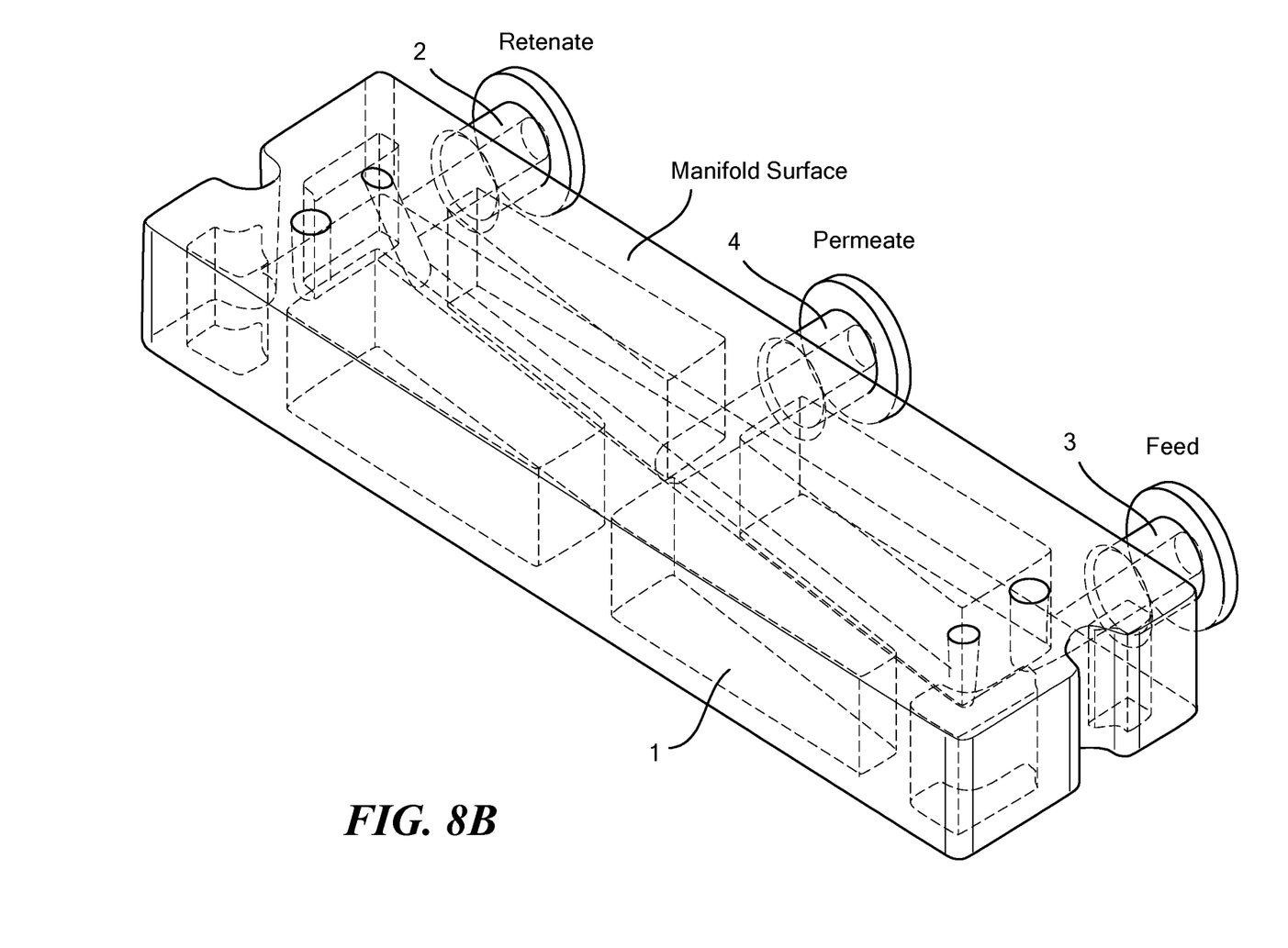

FIG. 7 shows a method of manufacturing the lab scale cassette of FIGS. 3A-3B, and FIGS. 8A-8B show an alternative, additive manufacturing approach for the cassette of FIG. 7. Referring to FIG. 3A-8B, the manifolds 1 and 1' may be fabricated by one of several approaches. FIGS. 7-8B illustrate various alternative designs and the respective manufacturing method. A more traditional manufacturing process includes both manual and computer-controlled milling and turning. Alternatively, a 3D printing additive manufacturing process may also be invoked, where the material is added one layer at a me. Additive processes include but are not limited to fused deposition and UV-cured resin technologies. Fused deposition has an additional advantage in that the technology is available that would allow for finished parts in both plastic and metal. Multiple passes or fusing of individual portions may also be performed, as opposed to a single continuous deposition/printing pass. An alternative approach is through milling and/or drilling in a so-called of subtractive manufacturing, or machining, from a single block of material or aggregations thereof.

FIG. 7 shows a drilling path 11' for a permeate passage 11 for joining a first permeate orifice 10-1 to a second permeate orifice 10-2. The drilling path 11' commences at a sidewall 164, maintains a trajectory to intersect a passage from the second permeate orifice to meet a permeate passage 11 from the first orifice 10-1 and define the junction 111. A plug or seal 13 is then inserted to close the drilled entry 166 and form a closed fluid system. Precise trajectory of the drill path 11' is employed to ensure an accurate meeting and junction 111 of the passages 11.

FIGS. 8A and 8B depict another lab-scale manifold designed for additive manufacturing. FIGS. 8A and 8B show internally connected permeate bores without requiring any external port for drill access. Furthermore the permeate port 4 is located in a same-side center orientation with the feed 2 and retentate 3 ports. The use of additive manufacturing also allows for additional material savings through pockets or voids 168 absent of print medium in non-critical areas.

A further feature shown in FIGS. 8A and 8B are positioning the permeate port 4 on the same side of the manifold between the feed port 2 and the retentate port 3 to maximize user accessibility and convenience during use. However, since user convenience is subjective and will vary by individual, there is no performance disadvantage by locating the permeate port 4 on the side opposite the feed and retentate Port Connections, as illustrated in FIGS. 8A and 8B.

Figure 9:
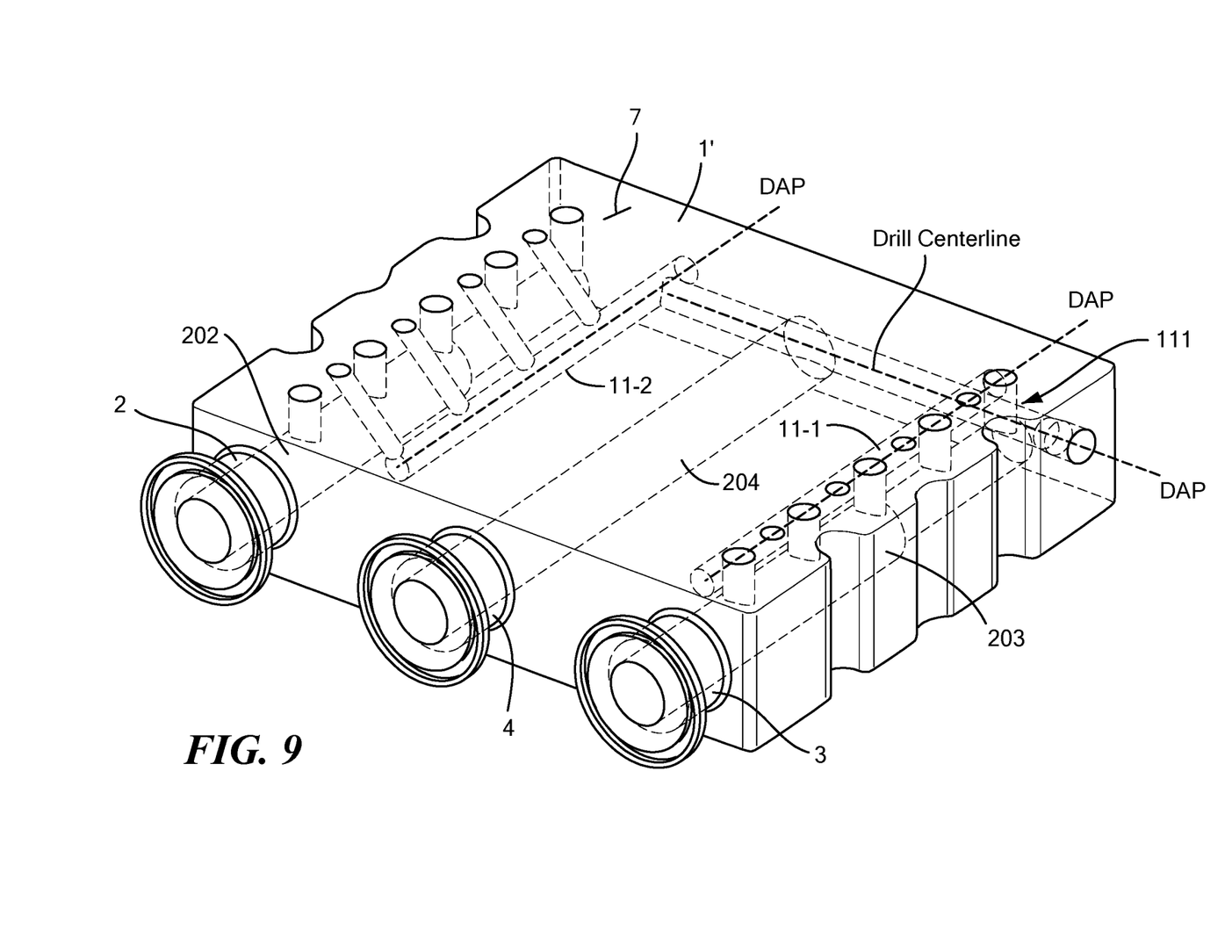
FIG. 9 shows a method of manufacturing a process scale cassette as in FIGS. 4A-4B.

FIG. 9 shows a method of manufacturing a process scale cassette as in FIGS. 4A-4B. Referring to FIGS. 2, 3 and 9, the machined process-scale manifold 1' is shown with the permeate port 4 located on the same side as the feed 2 and retentate 3. Because this is a machined component, and the permeate connection is located on the same side as the feed and retentate connections, three plug 13 locations are employed; one for each of the permeate orifice arrays with channels 11-1 and 11-2, and a third 11' drill bore that locates permeate passage 11-3 at an angle to pass above the retentate passage 203 and meet permeate passage 11-1 to define the junction 111 on the path 11' aligned to intersect permeate passage 11-2. Therefore, the bore trajectory 11' for the permeate channel 11-1 is drilled to pass between the surface 7 of the manifold and at least one of the feed channel 202 or the retentate channel 203. In general, as the number of feed and retentate orifices increases, permeate passages 11 leading to the union encounter tighter tolerances and more complex routing to avoid the retentate loop.

In various configurations, the manifold is formed from a substrate for forming the feed channel, the retentate channel and the plurality of permeate channels from either additive printing or extrusion, or from controlled boring of a monolithic substrate.

Figure 10:
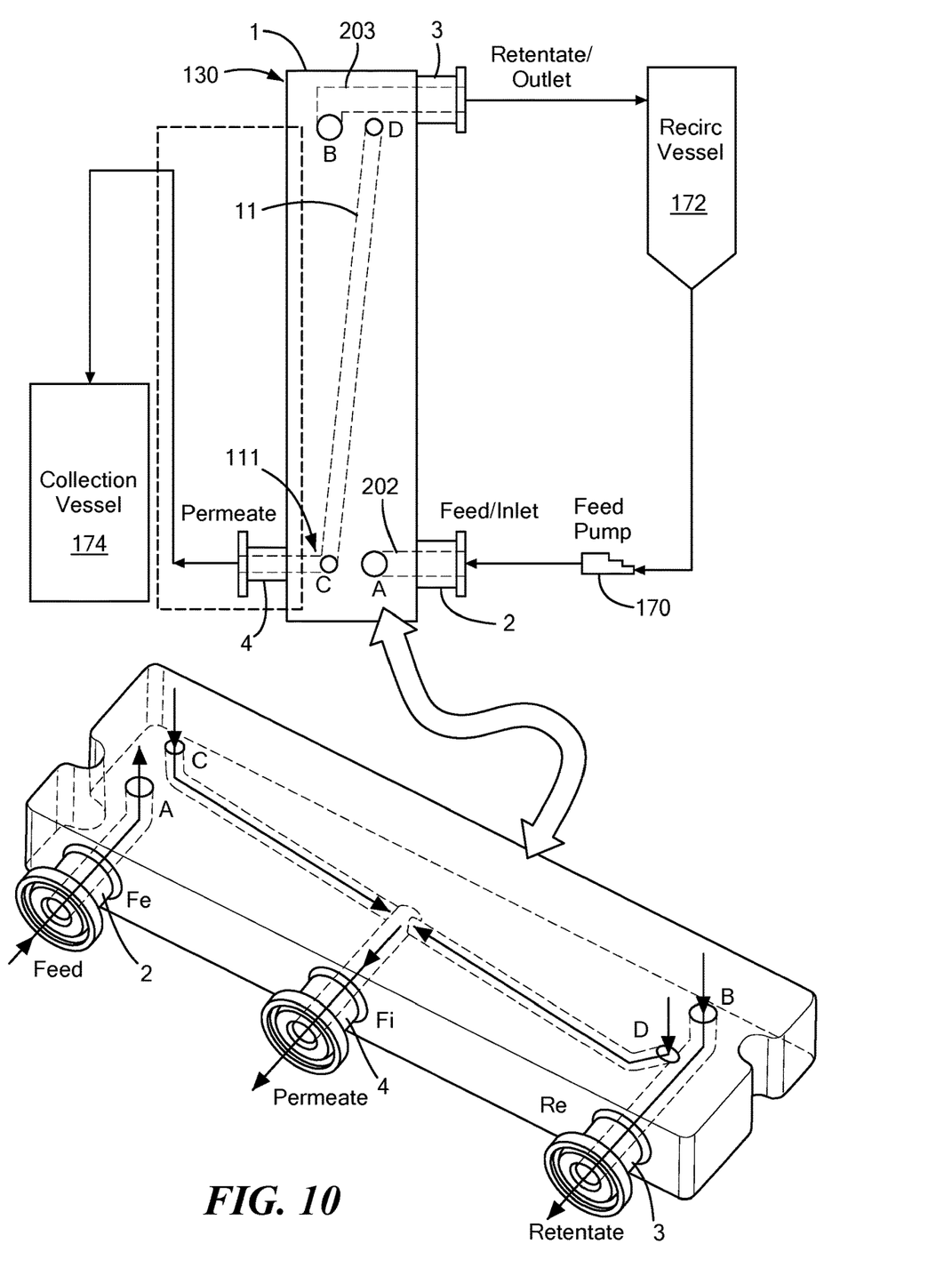
FIG. 10 shows an example setup of the filter cassette engaged in a lab application.

FIG. 10 shows an example setup of the filter cassette engaged in a lab application. A feed pump 170 recirculates the feed fluid 113 from a recirculation vessel 172 to the feed port 2 and receives the retentate from the retentate port 3. The manifold assembly 130 directs the filtrate to the single filtrate port 4 and into a collection vessel 174.

Figure 11:
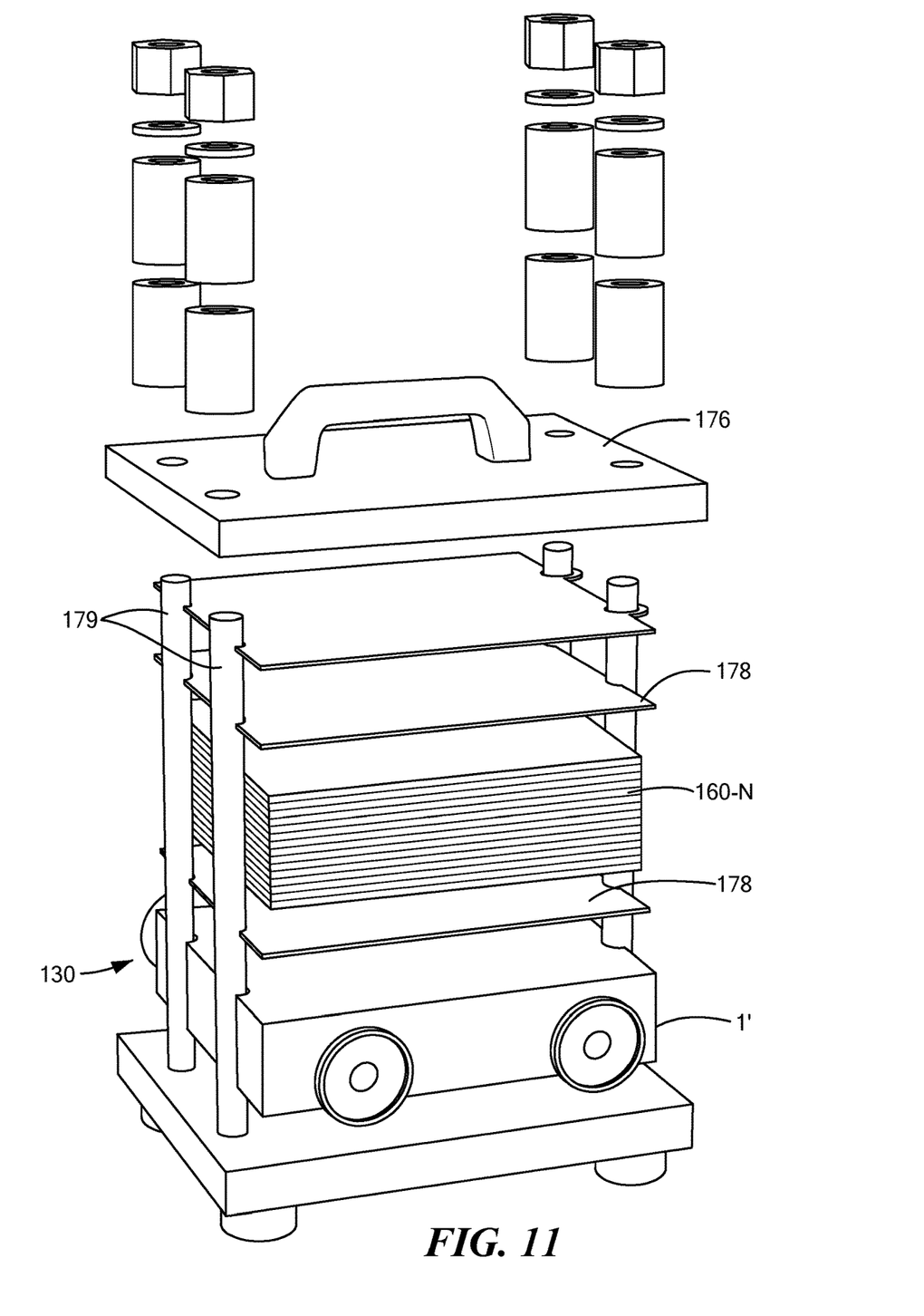
FIG. 11 shows an example of a full manifold filter assembly as in FIG. 10 for a process scale cassette.

FIG. 11 shows an example of a full manifold filter assembly as in FIG. 10 for a process scale cassette. Referring to FIGS. 10 and 11, the filter clamp is a device that is designed to create a constant compression force on the manifold assembly 130 including a manifold 1' and one or more filter cassettes 160. Clamping force can either be generated using manual techniques, most commonly with threaded nuts and rods 179 as shown below, or through the use of hydraulic cylinders. A filter clamp can be a simple device made from two rigid plates through which alignment rods are threaded. The rods 179 will allow for the manifold 1' and cassette(s) to be stacked in alignment while the compression force is applied. Each cassette will be sealed using a gasket 178 or integral sealing feature. For single use applications, all fluid contact items must be disposable; therefore, a plate or gasket that isolates the last cassette from a clamp endplate 176 is employed. The full manifold assembly 130 includes the filter cassette stack and the endplate 176 for sealing an opposed end of each the feed, retentate and permeate paths for forming a closed fluidic system.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a tangential flow filtration (TFF) apparatus for directing a feed across a filter membrane to a permeate passing through the filter and an unfiltered retentate, a manifold device for directing the feed, retentate and permeate to a filter assembly defined by stack of filter cassettes, comprising:

a manifold surface having a first side and a second side, the first side opposed from the second side;

a feed channel fluidically coupling a feed port to a feed outlet for fluid communication with the filter assembly, the feed outlet on the manifold surface adjacent to the first side;

a retentate channel fluidically coupling a retentate inlet to a retentate port, the retentate inlet configured for fluidic communication for receiving retentate from the filter assembly, the retentate inlet on the manifold surface adjacent to the second side;

at least two permeate inlets on the manifold surface and configured to receive permeate from the filter assembly in a respective plurality of permeate channels through the manifold, including at least one of the permeate inlets adjacent to the first side and at least one permeate inlet adjacent to the second side, each of the permeate inlets aligned with corresponding orifices on the filter assembly, the permeate channels fluidically coupled to a single, aggregate permeate port for output of the permeate via a common outflow;

a union fluidically coupling each of the plurality of permeate channels from each of the permeate inlets to the common outflow for output of the permeate from the filter assembly via the single, aggregate permeate port, each permeate channel receiving the permeate from the filter assembly via a respective permeate inlet, each of the permeate inlets adjacent to the first side or the second side of the manifold;

the permeate channels further comprising a junction channel, the junction channel extending under the manifold surface continuously from the at least one permeate inlet adjacent the second side to the at least one permeate inlet adjacent the first side, the junction channel forming fluidic communication with the plurality of permeate inlets and the common outflow.

2. The device of claim 1 wherein the permeate inlets are positioned on the manifold based on a correspondence to permeate orifices on the filter assembly.

3. The device of claim 1 further comprising a filter cassette stack defining the filter assembly, the filter cassette stack including one or more filter cassettes, each filter cassette having aligned feed, retentate, and permeate orifices adapted to form continuous feed, retentate and permeate paths through the filter cassette stack.

4. The device of claim 1 wherein at least one of the permeate channels passes between a surface of the manifold and at least one of the feed channel or the retentate channel.

5. The device of claim 3 wherein the filter cassette stack includes an endplate for sealing an opposed end of each the feed, retentate and permeate paths for forming a closed fluidic system.

6. The device of claim 1 further comprising a row of feed outlets, a row of retentate inlets and one or more rows of permeate inlets, the row of feed outlets, row of retentate inlets and the row of permeate inlets defined by a predetermined position of orifices on the filter assembly.

7. The device of claim 1 wherein each of the feed port, retentate port and permeate port have a port diameter and terminus defined by a flange having a flange diameter greater than the port diameter and adapted for engagement by a tri-clamp.

8. The device of claim 1 further comprising a plug aligned with the tubular channel for directing the permeate to the aggregate permeate port.

9. The method of claim 1 wherein the plurality of permeate inlets are aligned in a plurality of linear rows, each linear rows and permeate inlets aligned with corresponding orifices on the filter assembly, and a first row of permeate inlets are adjacent the first opposed side; and a second row of permeate inlets are adjacent the second opposed side.

10. The device of claim 1, further comprising:

a plurality of permeate inlets forming a linear arrangement adjacent to and parallel to the first side; and a plurality of permeate inlets forming a linear arrangement adjacent to and parallel to the second side.

11. The device of claim 1 wherein the junction channel extends more than half the longest dimension of the manifold.

12. In a tangential flow filtration (TFF) apparatus for directing a feed across a filter membrane to a permeate passing through the filter and an unfiltered retentate, a manifold device for directing the feed, retentate and permeate to a filter assembly defined by stack of filter cassettes, comprising:

a manifold surface having a first side and a second side, the first side opposed from the second side;

a feed channel fluidically coupling a feed port to a feed outlet for fluid communication with the filter assembly, the feed outlet on the manifold surface adjacent to the first side;

a retentate channel fluidically coupling a retentate inlet to a retentate port, the retentate inlet configured for fluidic communication for receiving retentate from the filter assembly, the retentate inlet on the manifold surface adjacent to the second side;

at least two permeate inlets on the manifold surface and configured to receive permeate from the filter assembly in a respective plurality of permeate channels through the manifold, including at least one of the permeate inlets adjacent to the first side and at least one permeate inlet adjacent to the second side, each of the permeate inlets aligned with corresponding orifices on the filter assembly, the permeate channels fluidically coupled to a single, aggregate permeate port for output of the permeate via a common outflow; and a union fluidically coupling each of the plurality of permeate channels from each of the permeate inlets to the common outflow for output of the permeate from the filter assembly via the single, aggregate permeate port, the permeate channels further comprising a junction channel, the junction channel extending under the manifold surface from the at least one permeate inlet adjacent the second side to the at least one permeate inlet adjacent the first side;

the junction channel forming fluidic communication with the plurality of permeate inlets and the common outflow in communication with the permeate port.

* * * * *